US007262796B2

(12) United States Patent
Jaspers

(10) Patent No.: US 7,262,796 B2
(45) Date of Patent: Aug. 28, 2007

(54) PROCESSING OF COLOR SIGNALS IN A COLOR CAMERA

(75) Inventor: Cornelis Antonie Maria Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 829 days.

(21) Appl. No.: 10/022,382

(22) Filed: Oct. 30, 2001

(65) Prior Publication Data

US 2002/0191085 A1    Dec. 19, 2002

(30) Foreign Application Priority Data

Nov. 1, 2000    (EP) .................................. 00203809

(51) Int. Cl.
*H04N 9/73*    (2006.01)
(52) U.S. Cl. .................................... 348/223.1; 348/280
(58) Field of Classification Search ............. 348/223.1, 348/280; 382/167; 358/518
See application file for complete search history.

(56) References Cited

U.S. PATENT DOCUMENTS

| 5,402,182 A | | 3/1995 | Sugiura ....................... 348/655 |
| 5,412,427 A | * | 5/1995 | Rabbani et al. ........... 348/394.1 |
| 5,579,047 A | | 11/1996 | Yamagami et al. ......... 348/242 |
| 5,668,596 A | * | 9/1997 | Vogel ....................... 348/222.1 |
| 5,917,556 A | * | 6/1999 | Katayama ................... 348/655 |
| 6,057,891 A | * | 5/2000 | Guerin et al. ............... 348/572 |
| 6,459,449 B1 | * | 10/2002 | Juen ........................ 348/223.1 |

FOREIGN PATENT DOCUMENTS

| EP | 0533488 A2 | | 3/1993 |
| EP | 0800318 A2 | | 10/1997 |
| EP | 0838903 A1 | | 4/1998 |
| JP | 03003497 A | | 5/1989 |
| JP | 6253318 | | 9/1994 |
| JP | 06253318 A | * | 9/1994 |
| WO | WO9904555 A2 | * | 1/1999 |
| WO | 0010331 A1 | | 2/2000 |

* cited by examiner

*Primary Examiner*—Ngoc-Yen Vu
*Assistant Examiner*—Gary C. Vieaux

(57) ABSTRACT

A method for processing analog color signals includes analog preprocessing sensor output signals to obtain analog preprocessed signals that cause a reduced amount of digital quantizatlon errors; converting the analog preprocessed signals into digital signals; reconstructing a first basic color signal, a second basic color signal, and a third basic color signal from the digital signals, and correcting the basic color signals, in which a three color signal matrix containing the first, second and third basic color signals is multiplied by a correction matrix containing coefficients that depend on the analog preprocessing. The analog preprocessing may include a white balance adjustment or the horizontal sum values of the correction matrix are adjusted to one for horizontal sum values larger than one, with the analog preprocessing comprising a corresponding multiplication in the analog preprocessing. A color camera includes an RGB Bayer sensor for generating the sensor output signals, and the above-mentioned processing device.

9 Claims, 1 Drawing Sheet

PROCESSING OF COLOR SIGNALS IN A COLOR CAMERA

Figure 1:
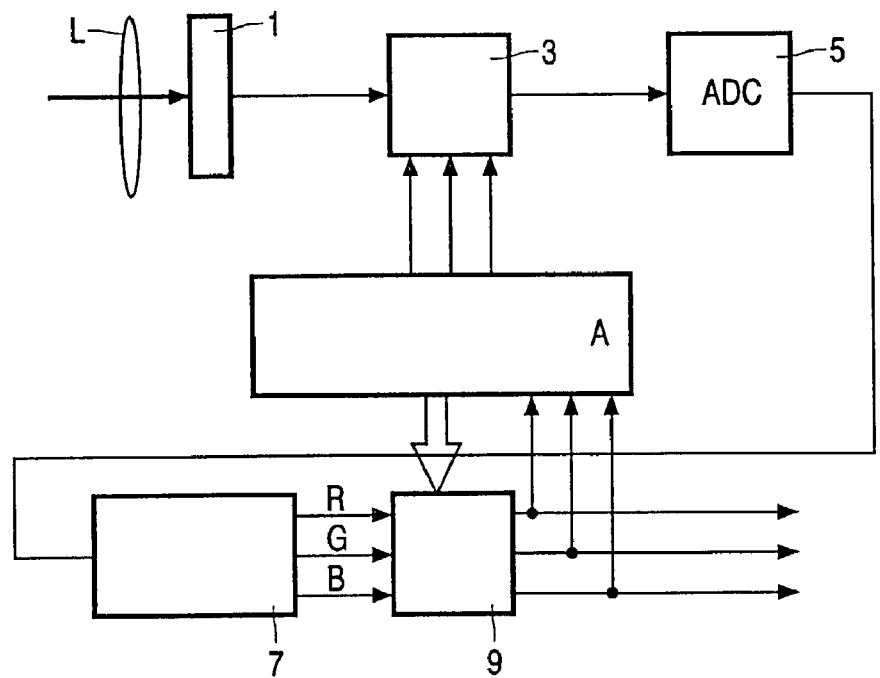

The invention relates to a method and device for processing color signals in a color camera, and to a color camera comprising such a device.

In a color camera, white balance is achieved when a neutral white object image by the camera under given illumination, is represented as red, green and blue signals having equal output levels. White balance is needed since the RGB representation produced by a color camera typically changes as the illumination of a scene varies. In some circumstances, a color camera white balance for certain illumination conditions, will not be white balanced for other illumination conditions. As a result, it is possible that an object under two different illuminations will have two different RGB representations even though a human observer would perceive the object as having the same color under both illuminations. In a known camera an image is captured by an RGB sensor. The output of this sensor contains basic analog color signals wherein each of the signals corresponds to a gain in one of the basic colors. These analog color signals are subsequently converted into at least one digital signal. The at least one digital signal is further subjected to a reconstruction method for obtaining reconstructed signals. The reconstructed signals comprise a first basic color signal R, a second basic color signal G and a third basic color signal B. These reconstructed signals are then further subjected to a correction method for obtaining standardized signals, suitable for worldwide acceptance. This correction method comprises of a multiplication of a three color signal matrix containing the first, second and third basic color signal R, G, and B by a correction matrix containing nine adjustable coefficients. In a usual color camera the white balance method is then applied to the standardized signals.

A disadvantage of this method is that quantization errors occurring during the A/D conversion step remain present in at least one of the standardized signals.

The object of the invention is to meet this problem and to minimize the quantization errors in the fully processed signals. To this end, the invention provides a processing method and device, and a color camera as defined by the independent claims. The dependent claims define advantageous embodiments.

Preferably, the invention provides a method and device for processing analog color signals, comprising:

analog preprocessing sensor output signals to obtain analog preprocessed signals that cause a reduced amount of digital quantization errors;

converting the analog preprocessed signals into digital signals;

reconstructing a first basic color signal (R), a second basic color signal (G), and a third basic color signal (B) from the digital signals; and correcting the basic color signals to obtain standardized signals, in which a three color signal matrix containing the first, second and third basic color signals (R, G, B) is multiplied by a correction matrix containing coefficients that depend on the analog preprocessing.

In a first embodiment, the analog preprocessing includes a white balance adjustment. An advantage of applying the white balance method before the analog color signals are converted into at least one digital signal is that the quantization errors in at least one of the basic color signals is minimized. An advantage of this method and this camera is that the white balance method is applied to signals that are free from quantization errors, ultimately lowering the quantization errors in the fully processed signals.

In a second embodiment, the horizontal sum values of the correction matrix are adjusted to one for horizontal sum values larger than one, with the analog preprocessing comprising a corresponding multiplication in the analog preprocessing to ensure to the overall processing multiplication remains the same as in the prior art. An advantage is that this multiplication leads to smaller quantization errors. An advantage is that the amplification is apart from being cursed with lower quantization errors, not further effected.

These and other aspects of the invention will be apparent from, and elucidated with reference to, the embodiments described hereafter.

Figure 2:
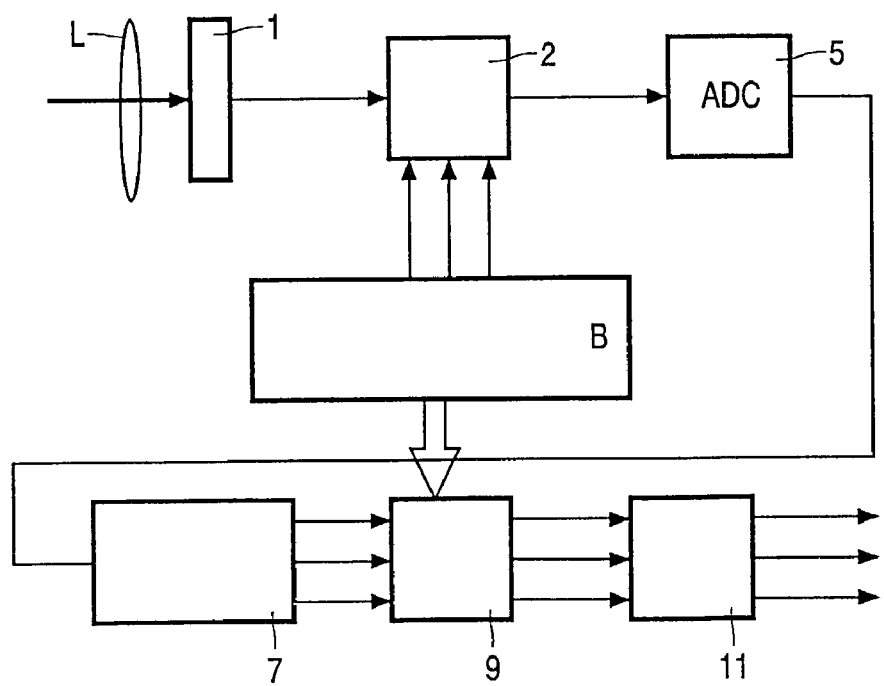

In the drawings:

FIG. 1 shows an embodiment of the method in accordance with the first aspect of the present invention; and FIG. 2 shows a second embodiment of the method in accordance with the second aspect of the present invention.

In both methods according to the invention for processing basic color signals in a color camera, light is collected and directed via a lens L into a sensor 1, preferably an RGB Bayer sensor supplying a single signal in which the color signals are multiplexed in accordance with the color mask on the sensor (line-alternatingly RGRG . . . and GBGB . . . ). The signals correspond to a gain in the basic colors. According to a first aspect of the invention, as shown in FIG. 1, these signals are pre-processed according to a white balance method 3 and then submitted to an analog/digital converter (ADC) 5. The digital signal is then subjected to a reconstruction method carried out by the RGB reconstruction unit 7 that generates all 3 RGB signals for each pixel where the sensor output signal had only one of these RGB signals for each pixel. The reconstructed signals comprise a first basic color signal R, a second basic color signal G, and a third basic color signal B. These basic color signals need to be corrected to the EBU standardized signals to which television sets and PC monitors worldwide are accustomed to. This correction comprises multiplication of a three color signal matrix containing the first, the second, and the third basic color signal R, G, B by a correction matrix containing nine adjustable coefficients referred to as $a_{xy}$ with x being 1, 2 or 3 and y being 1, 2 or 3. Mathematically this is expressed as follows:

$$\begin{bmatrix} R_o \\ G_o \\ B_o \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} R_i \\ G_i \\ B_i \end{bmatrix} \quad (1)$$

wherein $R_o$, $G_o$ and $B_o$ are the output RGB signals and $R_i$, $G_i$, $B_i$ the input RGB signals of the matrix 9. The standardized output signals $R_o$, $G_o$ and $B_o$ are then further processed as well as submitted to a white-balance-measurement-and-matrix-control-unit A. By this unit A the total contribution of each color measured over the whole scene, with the option that it is allowed to limit the number of pixels if they are distributed over that scene, is measured. To further illustrate the method according to the invention, the World Gray Assumption method is applied as an example of a white balance method. In the WGA method awbR is total contribution of Red/total contribution of Green and awbB is total contribution of Blue/total contribution of Green as measured/determined by unit A. These parameters awbR and awbB based on the standardized signals $R_o$, $G_o$ and $B_o$ are used for regulation of the white balanced method. The white balanced method as applied to the analog basic color signals $R_a$, $G_a$, and $B_a$ involves then a multiplication with the parameters contained from the white-balance-measurement-and-matrix-control-unit A. Using the WGA method as the white balance method, the regulation would involve a multiplication of the basic color signals $R_a$, $G_a$, $B_a$ according to:

$$R_{awb} = awbR \times R_a$$

$$G_{awb} = G_a$$

$$B_{awb} = awbB \times B_a \quad (2)$$

As a result, the white balance gains for red and blue are normalized to that of green. The input of the RGB reconstruction unit 7 is then:

$$R'_i = awbR \times R_i$$

$$G'_i = awbR \times G_i$$

$$B'_i = awbB \times B_i \quad (3)$$

where the prime refers to the fact that the signals have been subjected to the white balance method.

After subjection to the correction method for standardization, i.e. after multiplication by the matrix the basic color signals follow:

$$\begin{bmatrix} R'_o \\ G'_o \\ G'_o \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} awbR \times R_i \\ G_i \\ awbB \times B_i \end{bmatrix} \quad (4)$$

It must be clear that the matrix coefficients must be adjusted from their values valid for the prior art situation in which the white balance method takes place after the matrix 9 to settings which will be valid for the situation of FIG. 1 in which the white balance 3 takes place before the matrix 9. To this end the output of the white balance method is calculated for the situation in which the white balance method takes place after multiplication of the signals by the matrix. Assuming that the WGA method is applied, the output would have been:

$$\begin{bmatrix} R'_o \\ G'_o \\ B'_o \end{bmatrix} = \begin{bmatrix} a_{11} & (a_{12} \times awbR) & a_{13} \\ (a_{21}/awbR) & a_{22} & (a_{23}/awbB) \\ a_{31} & (a_{32} \times awbB) & a_{33} \end{bmatrix} \times \begin{bmatrix} awbR \times R_i \\ G_i \\ awbB \times B_i \end{bmatrix} \quad (5)$$

Comparing formulas 4 and 5 it is clear that the original matrix coefficients $a_{xy}$ have to be adjusted to matrix coefficients $b_{xy}$ with x being 1, 2, 3 and y being 1, 2, or 3, wherein, $$b_{11} = a_{11}$$

$$b_{12} = a_{12} \times awbR$$

$$b_{13} = a_{13}$$

$$b_{21} = a_{21}/awbR$$

$$b_{22} = a_{22}$$

$$b_{23} = a_{23}/awbB$$

$$b_{31} = a_{31}$$

$$b_{32} = a_{32} \times awbB$$

$$b_{33} = a_{33} \quad (6)$$

New values for the matrix coefficients are calculated by the amplifier control and matrix control unit. The calculation is ideally executed by a micro-controller. The method is, in that case, continuously applicable. At the output of the matrix 9 there may a gamma correction and an RGB to YUV conversion, both not shown.

Another method useful for reducing the quantization errors is shown in FIG. 2, according to another aspect of the invention. In this method the analog color signals are amplified by an amplifier 2. The analog color signals are to this end multiplied by a factor at least as large as 1 as further elaborated on in the following. To outline this method, the sum of the horizontal matrix coefficients is written as:

$$\Sigma R = a_{11} + a_{12} + a_{13}$$

$$\Sigma G = a_{21} + a_{22} + a_{23}$$

$$\Sigma B = a_{31} + a_{32} + a_{33} \quad (7)$$

More specifically the method involves a multiplication of the first, second and third analog basic color signal $R_a$, $G_a$ and $B_a$ from the sensor 1 by the following factors: cR, cG and cB. The values of cR, cG and cB are determined by the following rules:

if $\Sigma R > 1$ then $cR = \Sigma R$ else $cR = 1$ if $\Sigma G > 1$ then $cG = \Sigma G$ else $cG = 1$ if $\Sigma B > 1$ then $cB = \Sigma B$ else $cB = 1$ \quad (b 8)

To maintain the original signal amplitude, the reconstructed signals need to be subjected to a compensation for the amplification. The correction for standardization should therefore be as follows:

$$\begin{bmatrix} R'_o \\ G'_o \\ B'_o \end{bmatrix} = \begin{bmatrix} (a_{11})/aR & (a_{12})/aG & (a_{13})/(aB) \\ (a_{21})/aR & (a_{22})/(aG) & (a_{23})/(aB) \\ (a_{31})/(aR) & (a_{32})/(aG) & (a_{33})/(aB) \end{bmatrix} \times \begin{bmatrix} (aR \times Ri) \\ (aG \times Gi) \\ (aB \times Bi) \end{bmatrix} \quad (9)$$

It follows then that the original matrix coefficients x×y need to be replaced by coefficients $b_{xy}$ with x being 1, 2 or 3 and y being 1, 2 or 3, according to the following rules:

$$b_{11} = a_{11}/cR$$

$$b_{12} = a_{12}/cG$$

$$b_{13} = a_{13}/cB$$

$$b_{21} = a_{21}/cR$$

$$b_{22} = a_{22}/cG$$

$$b_{23} = a_{23}/cR$$

$$b_{31} = a_{31}/cR$$

$$b_{32} = a_{32}/cG$$

$$b_{33} = a_{33}/cB \quad (10)$$

where $b_{xy}$, with x being 1, 2, 3 and y being 1, 2, or 3, represent the new matrix coefficients.

The white balance method 11 can now be applied to the compensated reconstructed signals which are cursed with lower quantization errors, compared to the known method. The replacement of the matrix coefficients by the newly derived matrix coefficients only take place once, for instance when the camera is switched on. The replacement of $a_{xy}$ with $b_{xy}$ and the regulation of the amplifier is carried out by the amplifier control & matrix control unit B.

Salient aspects of the present invention include the idea of improving the digital quantization by shifting certain camera functions (white balance or default adjustment of the correction matrix) from the digital domain to the analog domain. The realization of the white balance on the multiplexed analog raw data from the RGB Bayer image sensor means that less quantization errors will occur in the red and blue color signals. For improving the digital quantization, the matrix in the digital domain is preferably continuously corrected in case of a continuously changing white balance in the analog domain; hereby, the color reproduction is maintained in comparison with a full digitized method using first the matrix and thereafter the white balance. Alternatively, in the analog domain, the horizontal sum of the correction matrix coefficients is adjusted in such a way, that in the digital domain, the horizontal sum is almost unity. The used method guarantees the maintenance of color reproduction and has to be executed only once, for example if the camera is switched on.

Although embodiments of the present invention have been described in detail herein, it is to be understood that this invention is not limited to these precise embodiments and that modifications and variations may be effected therein by one skilled in the art without departing from the scope of the invention as defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of processing analog color signals, the method comprising:
    analog preprocessing sensor output signals to obtain analog preprocessed signals that cause a reduced amount of digital quantization errors;
    converting the analog preprocessed signals into digital signals;
    reconstructing a first basic color signal R, a second basic color signal G, and a third basic color signal B from the digital signals; and
    correcting the basic color signals to obtain standardized signals, the correcting step comprising multiplication of a three color signal matrix containing the first, second and third basic color signals R, G, B by a correction matrix containing RGB matrix coefficients that depend on the analog preprocessing step.

2. A method according to claim 1, wherein the analog preprocessing step includes a white balance adjustment.

3. A method according to claim 2, wherein the coefficients of the correction matrix depend on the analog preprocessing step in that correction matrix coefficients $a_{xy}$ are replaced by coefficients $b_{xy}$ with $b_{11}=a_{11}$ $b_{12}=a_{12} \times awbR$ $b_{13}=a_{13}$ $b_{21}=a_{21}/awbR$ $b_{22}=a_{22}$ $b_{23}=a_{23}/awbB$ $b_{31}=a_{31}$ $b_{32}=a_{32} \times awbB$ $b_{33}=a_{33}$ wherein awbR equals a total contribution of Red divided by a total contribution of Green and awbB equals a total contribution of Blue divided by a total contribution of Green wherein the total contributions of Red, Green and Blue are determined from the standardized signals.

4. A method according to claim 1, wherein the sensor output signals comprise first, second and third analog color signals $R_a$, $G_a$ and $B_a$, and wherein said analog preprocessing step includes respectively multiplying the color signals by cR cG cB where $cR=\Sigma R$ if $\Sigma R>1$, else $cR=1$;
where $cG=\Sigma G$ if $\Sigma G>1$ else $cG=1$;
where $cB=\Sigma B$ if $\Sigma B>1$ else $cB=1$, with $\Sigma R=a_{11}+a_{12}+a_{13}$ $\Sigma G=a_{21}+a_{22}+a_{23}$ $\Sigma B=a_{31}+a_{32}+a_{33}$ with $a_{xy}$ being the coefficients the correction matrix would have without the analog preprocessing step, and wherein the coefficients $a_{xy}$ of the correction matrix are replaced by coefficients $b_{xy}$ with
    $b_{xy}=a_{xy}/cR$ for $x=1,2,3$ and $y=1$;
    $b_{xy}=a_{xy}/cG$ for $x=1,2,3$ and $y=2$;
    $b_{xy}=a_{xy}/cB$ for $x=1,2,3$ and $y=3$.

5. A device for processing analog color signals, the device comprising:
    means for analog preprocessing sensor output signals to obtain analog preprocessed signals that cause a reduced amount of digital quantization errors;
    means for converting the analog preprocessed signals into digital signals;
    means for reconstructing a first basic color signal R, a second basic color signal G, and a third basic color signal B from the digital signals; and
    means for correcting the basic color signals to obtain standardized signals, the correcting means comprising means for multiplying a three color signal matrix containing the first, second and third basic color signals R, G, B by a correction matrix containing coefficients that depend on the analog preprocessing means.

6. A device according to claim 5, wherein the analog preprocessing means includes means for carrying out a white balance adjustment.

7. A device according to claim 6, wherein the coefficients of the correction matrix depend on the analog preprocessing step in that correction matrix coefficients $a_{xy}$ are replaced by coefficients $b_{xy}$ with $$b_{11}=a_{11}$$
$$b_{12}=a_{12} \times awbR$$
$$b_{13}=a_{13}$$
$$b_{21}=a_{21}/awbR$$
$$b_{22}=a_{22}$$
$$b_{23}=a_{23}/awbB$$
$$b_{31}=a_{31}$$
$$b_{32}=a_{32} \times awbB$$
$$b_{33}=a_{33} \quad (6)$$

wherein awbR equals a total contribution of Red divided by a total contribution of Green and awbB equals a total contribution of Blue divided by a total contribution of Green wherein the total contributions of Red, Green and Blue are determined from the standardized signals.

8. A device according to claim 5, wherein the sensor output signals comprise first, second and third analog color signals $R_a$, $G_a$ and $B_a$, and wherein said analog preprocessing means includes means for respectively multiplying the color signals by $$cR$$
$$cG$$
$$cB$$

where $cR=\Sigma R$ if $\Sigma R>1$, else $cR=1$;
where $cG=\Sigma G$ if $\Sigma G>1$ else $cG=1$;
where $cB=\Sigma B$ if $\Sigma B>1$ else $cB=1$, with $$\Sigma R=a_{11}+a_{12}+a_{13}$$
$$\Sigma G=a_{21}+a_{22}+a_{23}$$
$$\Sigma B=a_{31}+a_{32}+a_{33}$$

with $a_{xy}$ being the coefficients the correction matrix would have without the analog preprocessing step, and wherein the coefficients $a_{xy}$ of the correction matrix are replaced by coefficients $b_{xy}$ with $b_{xy}=a_{xy}/cR$ for $x=1,2,3$ and $y=1$;
$b_{xy}=a_{xy}/cG$ for $x=1,2,3$ and $y=2$;
$b_{xy}=a_{xy}/cB$ for $x=1,2,3$ and $y=3$.

9. A color camera comprising:
a sensor for generating sensor output signals; and
a device as claimed in claim 5.

* * * * *